(12) United States Patent
Wang et al.

(10) Patent No.: US 11,681,088 B2
(45) Date of Patent: Jun. 20, 2023

(54) LIGHTING DEVICE AND LAMP APPARATUS

(71) Applicant: OPPLE LIGHTING CO., LTD., Shanghai (CN)

(72) Inventors: Xiaolei Wang, Shanghai (CN); Shengyu Qiao, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 240 days.

(21) Appl. No.: 17/136,190

(22) Filed: Dec. 29, 2020

(65) Prior Publication Data

US 2021/0191030 A1 Jun. 24, 2021

Related U.S. Application Data

(63) Continuation of application No. PCT/CN2019/108155, filed on Sep. 26, 2019.

(30) Foreign Application Priority Data

Sep. 26, 2018 (CN) .......................... 201811122456.X
Sep. 26, 2018 (CN) .......................... 201821570066.4
Sep. 26, 2019 (CN) .......................... 201910768060.0

(51) Int. Cl.
*F21V 8/00* (2006.01)
*F21S 43/236* (2018.01)
*F21V 21/008* (2006.01)

(52) U.S. Cl.
CPC .......... *G02B 6/0058* (2013.01); *F21S 43/236* (2018.01); *F21V 21/008* (2013.01);
(Continued)

(58) Field of Classification Search
CPC .................. F21V 2200/20; F21S 41/24; F21S 43/235–251; F21K 9/61;
(Continued)

(56) References Cited

U.S. PATENT DOCUMENTS 8,154,181 B1 4/2012 Lin et al.
2012/0182757 A1* 7/2012 Liang ...................... F21K 9/232
362/555
2013/0335995 A1 12/2013 Te-Kai et al.

FOREIGN PATENT DOCUMENTS

CN 102537714 A 7/2012
CN 202629732 U 12/2012
(Continued)

OTHER PUBLICATIONS

International Search Report of PCT Application No. PCT/CN2019/108155 dated Dec. 27, 2019 with English translation, (6p).
(Continued)

*Primary Examiner* — Sean P Gramling
(74) *Attorney, Agent, or Firm* — Arch & Lake LLP (57) ABSTRACT

The present disclosure discloses a lighting device and a lamp apparatus. The lighting device includes a light source supply assembly and a curved light guide element. The light source supply assembly includes a fixing base and a light source module. The fixing base has two opposite first accommodating areas, and the light source module is disposed in at least one of the two first accommodating areas, two ends of the curved light guide element are inserted into the two first accommodating areas, and one end of the curved light guide element corresponding to the light source module has a light source introduction bump, the light source introduction bump has a light incident surface corresponding to the light source module, the light source module supplies a light source, the light source enters from the light incident surface and propagates along the curved light guide element.

17 Claims, 10 Drawing Sheets

(52) U.S. Cl.
CPC ............ *G02B 6/004* (2013.01); *G02B 6/0086* (2013.01); *F21V 2200/20* (2015.01)

(58) Field of Classification Search
CPC .... G02B 6/11–0095; B60Q 3/60; B60Q 3/62; B60Q 3/64
See application file for complete search history.

(56) References Cited

FOREIGN PATENT DOCUMENTS

| | | |
|---|---|---|
| CN | 202812969 U | 3/2013 |
| CN | 206320625 U | 7/2017 |
| CN | 206398541 U | 8/2017 |
| CN | 109000185 A | 12/2018 |
| CN | 208794237 U | 4/2019 |
| CN | 110513629 A | 11/2019 |
| JP | 2018113133 A | 7/2018 |

OTHER PUBLICATIONS

First Office Action issued to Chinese Application No. 201910768060.0 dated Jul. 22, 2020 with English translation, (11p).

Second Office Action issued to Chinese Application No. 201910768060.0 dated Aug. 19, 2020 with English translation, (11p).

Third Office Action issued to Chinese Application No. 201910768060.0 dated Oct. 20, 2020 with English translation (20p).

\* cited by examiner

LIGHTING DEVICE AND LAMP APPARATUS

CROSS-REFERENCE TO RELATED APPLICATIONS

This application is based upon and claims the priority of PCT patent application No. PCT/CN2019/108155 filed on Sep. 26, 2019 which claims priority to the Chinese patent application No. 201811122456.X filed on Sep. 26, 2018 and the Chinese patent application No. 201821570066.4 filed on Sep. 26, 2018 and the Chinese patent application No. 201910768060.0 filed on Sep. 26, 2019, the entire content of both of which is hereby incorporated by reference herein for all purposes.

TECHNICAL FIELD

The present disclosure relates to the field of illumination, and particularly to a lighting device and a lamp apparatus.

BACKGROUND

Curved lamp arms or light guide plates have been used in lamps, which makes the shape of the lamps changeable. However, there is no such lamp that utilizes the curved lamp arm or light guide plate alone. Sometimes, the lamp utilizing the curved lamp arm or light guide plate is relatively complicated, not easy to assemble, and cannot be disassembled after assembly, which may cause inconvenience in storage and transportation.

SUMMARY

The present disclosure provides a lighting device and a lamp apparatus.

In the first aspect, a lighting device is provided. The lighting device may include a light source supply assembly and a curved light guide element. The light source supply assembly may include a fixing base and a light source module. The fixing base may have two opposite first accommodating areas, the light source module may be disposed in at least one of the two first accommodating areas, two ends of the curved light guide element may be inserted in the two first accommodating areas respectively, one end of the curved light guide element corresponding to the light source module may have a light source introduction bump, the light source introduction bump may have a light incident surface corresponding to the light source module, the light source module may provide a light source, and the light source may enter from the light incident surface and propagates along the curved light guide element.

In the second aspect, a lamp apparatus is provided. The lamp apparatus may include at least one lighting device and a fixing mount for fixing the lighting device at a preset position. The at least one lighting device may include a light source supply assembly and a curved light guide element.

The light source supply assembly may include a fixing base and a light source module. The fixing base may have two opposite first accommodating areas, the light source module may be disposed in at least one of the two first accommodating areas, two ends of the curved light guide element may be inserted in the two first accommodating areas respectively, one end of the curved light guide element corresponding to the light source module may have a light source introduction bump, the light source introduction bump may have a light incident surface corresponding to the light source module, the light source module may provide a light source, and the light source may enter from the light incident surface and propagates along the curved light guide element.

The fixing mount may be electrically connected with the lighting device and may supply power to the lighting device.

It is to be understood that both the foregoing general description and the following detailed description are exemplary and explanatory only and are not restrictive of the present disclosure.

BRIEF DESCRIPTION OF THE DRAWINGS

The drawings described herein are intended to provide a further understanding of the present disclosure and constitute a part of the present disclosure. The illustrative examples of the present disclosure and the description thereof are used for explaining the present disclosure and do not constitute any inappropriate limitation of the present disclosure.

DETAILED DESCRIPTION

Examples of the present disclosure are described in connection with the drawings of the examples of the present disclosure. The described examples are just a part but not all of the examples of the present disclosure. Based on the examples in the present disclosure, those ordinary skill in the art can obtain other example(s), without any inventive work, which should be within the scope of the disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
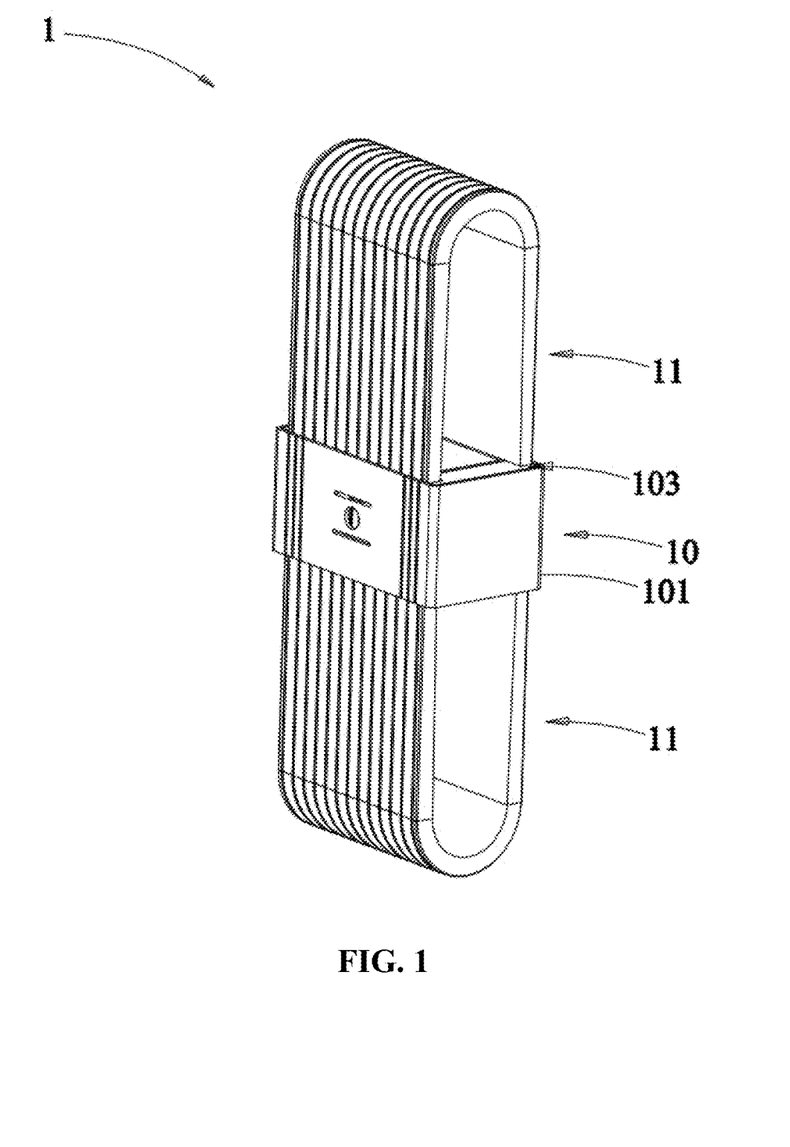
FIG. 1 is a perspective view of a lighting device according to a first example of the present disclosure.
Figure 2:
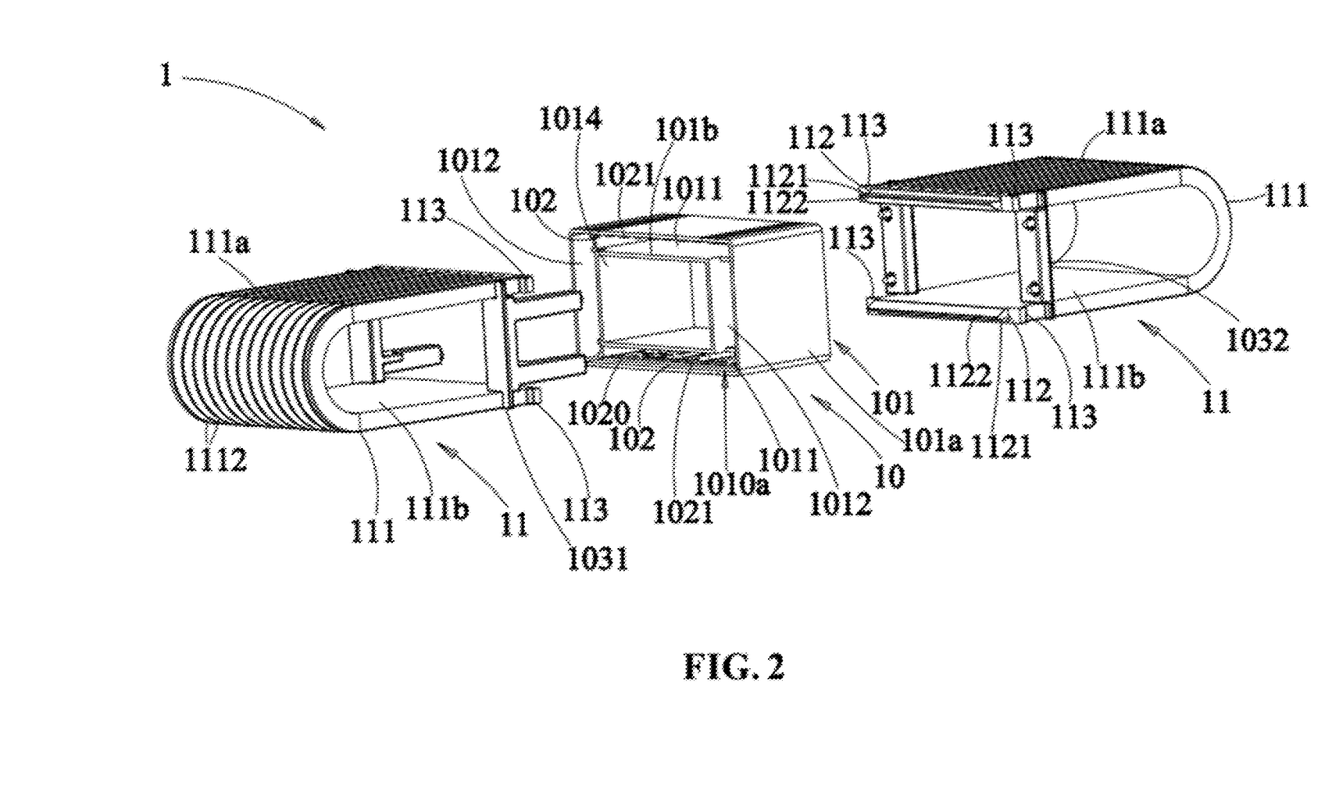
FIG. 2 is an exploded perspective view of a lighting device according to a first example of the present disclosure.
Figure 3:
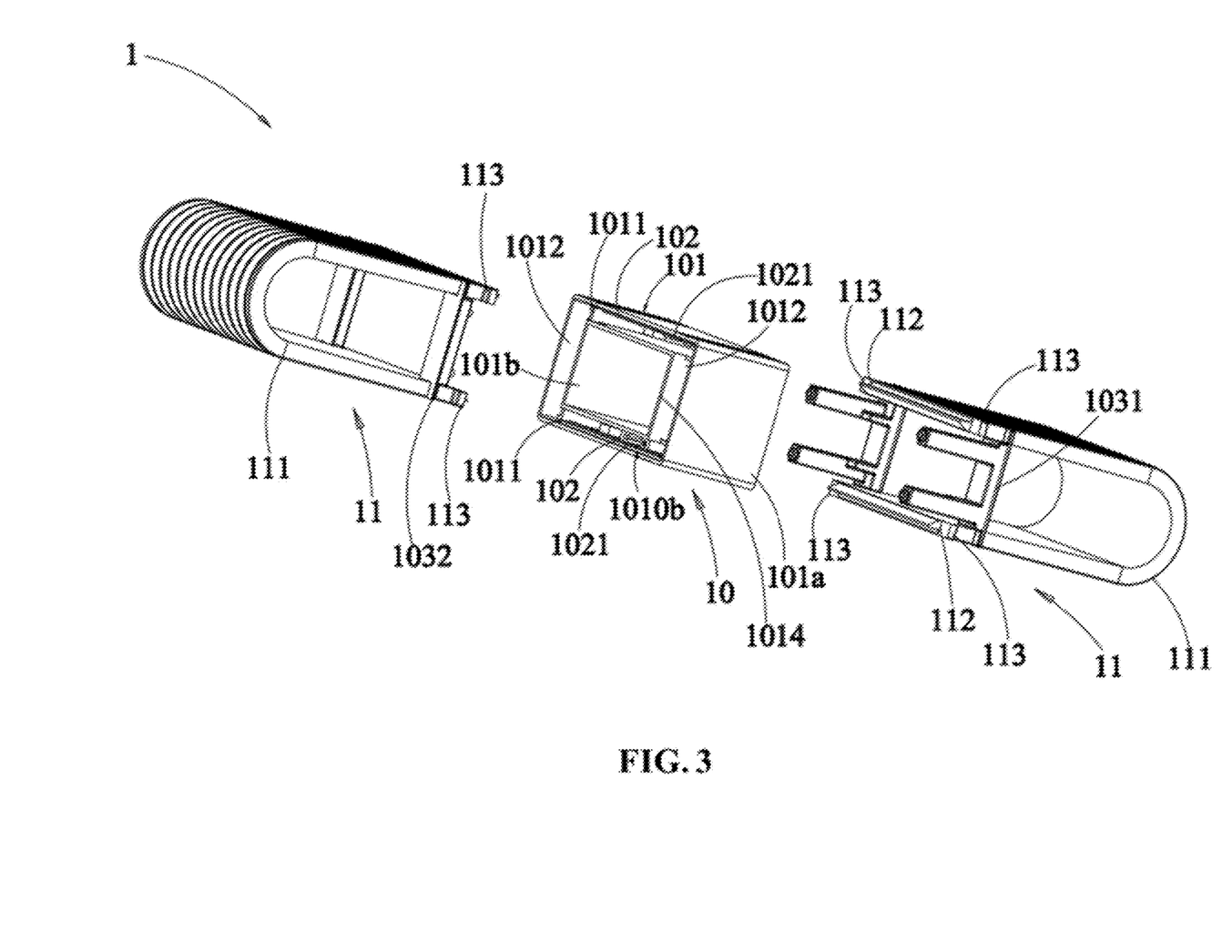
FIG. 3 is another exploded perspective view of a lighting device according to a first example of the present disclosure.

Please refer to FIGS. 1, 2 and 3 which are perspective views and exploded perspective views of the lighting device according to the first example of the present disclosure. As shown in the figures, the present example provides a lighting device 1, including a light source supply assembly 10 and a curved light guide element 11. The light source supply assembly 10 includes a fixing base 101 and a light source module 102. The fixing base 101 includes at least one first accommodating area 1011. FIG. 1 shows the case where two first accommodating areas 1011 are arranged to face away from each other, and it also can be the case where six first accommodating areas 1011 are arranged to face away from the fixing base 11 in a circumference direction, or the like, depending on actual conditions. The light source module 102 and at least one end of the curved light guide element 11 are located in the first accommodating area 1011. It may be the case in FIG. 1 that both ends of the curved light guide element 11 are disposed in a same first accommodating area 1011, it may also be the case that two ends of the curved light guide element 11 are respectively disposed in two first accommodating areas 1011 to form a bridged structure, without particularly described here.

The two first accommodating areas 1011 shown in FIG. 1 are facing way from each other, and both ends of the curved light guide element 11 are disposed, e.g., inserted in the same first accommodating area 1011, which is more advantageous for the effect of light supply.

The lighting device 1 shown in FIG. 1 includes a light source supply assembly 10 and two curved light guide elements 11. The two curved light guide elements 11 are disposed opposite to each other at two ends of the light source supply assembly 10. The light source supply assembly 10 supplies a light source to the two curved light guide elements 11, and the light source propagates inside the two curved light guide elements 11 and exits from the two curved light guide elements 11. Of course, it's also possible that the light source supply assembly 10 is provided with only one curved light guide element 11.

The light source supply assembly 10 includes a fixing base 101 and two light source modules 102. The fixing base 101 has a first housing 101a and a second housing 101b disposed inside the first housing 101a; each of the first housing 101a and the second housing 101b has four side walls, and each of two ends of the first housing 101a has a first fixing opening 1010a and a second fixing opening 1010b opposite to the first fixing opening 1010a. The four side walls of the first housing 101a correspond to the four side walls of the second housing 101b, respectively, and are parallel to the corresponding side walls of the second housing 101b, respectively. There is an accommodating space between the four side walls of the first housing 101a and the four side walls of the second housing 101b. The accommodating space includes two opposite first accommodating areas 1011 and two opposite second accommodation areas 1012; and the two second accommodation areas 1012 are located between the two first accommodation areas 1011.

The two light source modules 102 are respectively attached to the side walls of the corresponding first accommodating areas 1011. The side wall can be the side wall of the first housing 101a or the side wall of the second housing 101b, as long as the light source of the light source module 102 can enter the curved light guide element 11. In this example, the two light source modules 102 are both disposed on the side wall of the first housing 101a. Each light source module 102 has a circuit board 1020 and a plurality of light-emitting diodes (LEDs) 1021 arranged on the circuit board 1020. In this example, the surfaces of the circuit boards 1020 of the two light source modules 102 provided with the plurality of light-emitting diodes 1021 are facing each other. The plurality of light-emitting diodes 1021 on each light source module 102 are arranged in two opposite rows, and the number of the light-emitting diodes 1021 in the two rows is the same.

Each curved light guide element 11 is a light-transmitting body, which includes a light guide plate body 111 and two light source introduction bumps 112. The light guide plate body 111 is curved, and end surfaces of its two ends are aligned with each other. In this example, the light guide plate body 111 is bent into a U shape; of course, the light guide body 111 can also be bent into other shapes, which will not be particularly described here. The light guide plate body 111 has a first light guide surface 111a and a second light guide surface 111b opposite to each other. End surfaces of both ends of the light guide plate body 111 are located between the first light guide surface 111a and the second light guide surface 111b. In this example, the first light guide surface 111a is an outer surface, the second light guide surface 111b is an inner surface, and at least one of the first light guide surface 111a and the second light guide surface 111b is a light exiting surface. The two light source introduction bumps 112 are respectively arranged on two ends of the light guide plate body 111, and end surfaces of the two light source introduction bumps 112 are aligned with each other. In other words, the end surfaces of the two light source introduction bumps 112 are located on a same plane. One of the two opposite surfaces of each light source introduction bump 112 is the light incident surface 1121. In this example, the surface of each light source introduction bump 112 that is on the same side as the first light guide surface 111a of the light guide plate body 111 is the light incident surface 1121.

Furthermore, the first light guide surface 111a or/and the second light guide surface 111b of the light guide plate body 111 of the curved light guide element 11 has/have a microstructure. The microstructure in this example is a plurality of linear patterns 1112 arranged at intervals. Of course, the plurality of patterns 1112 can be grooves, ridges, or other shapes, such as wavy shapes and folded-line shapes; the microstructures can also be a plurality of bumps, a plurality of grooves, or structures that cause an unevenness of the first light guide surface 111a or/and the second light guide surface 111b; and the bumps or grooves are in a shape of hemisphere, corner column, pyramid or cylinder. When the light source passes through the microstructure of the light guide plate body 111, the propagation path of the light source can be changed, so that the light source can exit from the first light guide surface 111a or the second light guide surface 111b, or can continue to propagate inside the light guide plate body 111, which allows the light guide plate body 111 to achieve different visual effects.

Furthermore, astigmatic particles can be added to the light guide plate body 111, and when the light source encounters the astigmatic particles, the astigmatic particles can change the propagation path of the light source.

Figure 4:
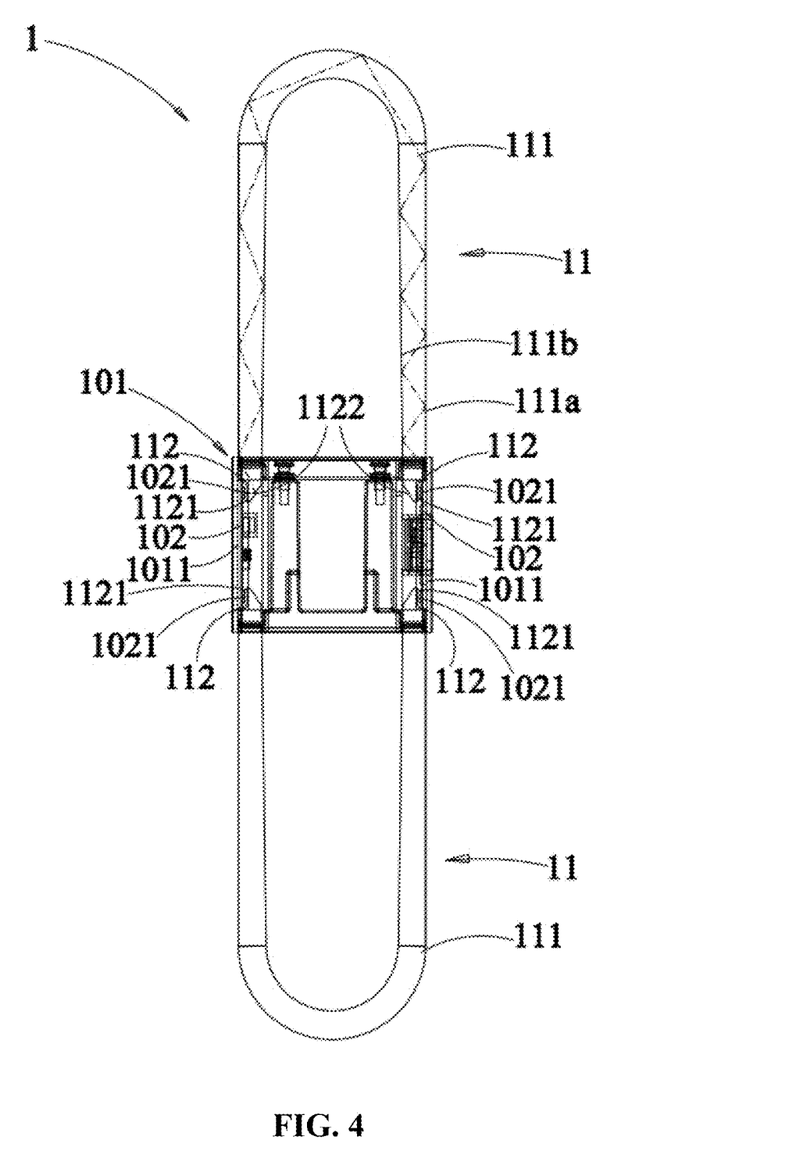
FIG. 4 is a sectional view of a lighting device according to a first example of the present disclosure.

Please also refer to FIG. 4, which is a schematic view of the lighting device according to the first example of the present disclosure; as shown in the figure, when two curved light guide elements 11 are disposed on the light source supply assembly 10, one of the two curved light guide elements 11 is inserted from the first fixing opening 1010a of the fixing base 101, and the other curved light guide element 11 is inserted from the second fixing opening 1010b of the fixing base 101. The two light source introduction bumps 112 of each curved light guide element 11 are respectively inserted into the corresponding first accommodating areas 1011, and the light guide plate body 111 is located outside the fixing base 101. Each light source introduction bump 112 is located on one side of the corresponding light source module 102, and the plurality of light-emitting diodes 1021 arranged in a row in each light source module 102 correspond to the light incident surface 1121 of an adjacent light source introduction bump 112.

When the lighting device 1 of this example is in use, the two light source modules 102 of the light source supply assembly 10 are electrically connected to an external power source, and the external power source supplies power to the circuit boards 1020 of the two light source modules 102; the circuit boards 1020 drive the plurality of light-emitting diodes 1021 to emit a light source, the light source emitted by the plurality of light-emitting diodes 1021 enter from the two light incident surfaces 1121 of the two light source introduction bumps 112 of each curved light guide element 11; the light source that enters from the two light incident surfaces 1121 propagates, with a total reflection, (as shown by the broken line in the light guide plate body 111 in the figure) along a length of the light guide plate body 111 inside the light guide plate body 111, or, the light source inside the light guide plate body 111 is refracted by the microstructure of the first light guide surface 111a or the second light guide surface 111b or refracted by the astigmatic particles in the light guide plate body 111, and exits from the first light guide surface 111a or the second light guide surface 111b, so that the light guide plate body 111 emits light uniformly. In this example, a distance between the first light guide surface 111a and the second light guide surface 111b at a middle of the light guide plate body 111 is greater than a distance between the first light guide surface 111a and the second light guide surface 111b at both ends of the light guide plate body 111; that is to say, the light guide plate body 111 is narrower at both ends and is wider at the middle, meaning that a light incident portion of the curved light guide element 11 is narrower, which ensures that most of the light source can enter the curved light guide assembly 11. This example is only an illustrative implementation of the present disclosure. It is also possible to provide only a single light source module 102 and the light source enters from only one of the two light source introduction bumps 112 of each curved light guide element 11; in this case, the light source still can be propagated inside the light guide plate body 111 to allow the light guide plate body 111 to emit light. If only a single light source module 102 is provided, the light source introduction bump 112 that does not correspond to a light source module 102 can be omitted.

Furthermore, an end surface of each light source introduction bump 112 of each curved light guide element 11 is provided with a light shielding layer 1122, as shown in FIG. 2, to form a reflective surface. The light shielding layer 1122 prevents the exiting light of the light source from transmitting through the end surface of each light source introduction bump 112, and reflects the exiting light of the light source and allows the light source to be converted and propagated towards the light guide plate body 111, so as to effectively reduce the loss of light energy. In this example, the end surface of each light source introduction bump 112 has an inclined surface, the light shielding layer 1122 is disposed on the inclined surface, and there is an included angle between the light shielding layer 1122 and the light incident surface 1121, and the angle of the included angle is less than 90 degrees, so that the light shielding layer 1122 is inclined with respect to the light incident surface 1121 and is located in the propagation direction of the light source, as shown in FIG. 4. When the light source enters from the light incident surface 1121, since the light shielding layer 1122 is located in the propagation direction of the light source, the light source propagates to the surface of the light shielding layer 1122, and the light shielding layer 1122 reflects the light source, changes the propagation direction of the light source, and causes the light source to propagate along the light guide plate body 111.

Furthermore, the light incident surface 1121 is lower than the first light guide surface 111a of the corresponding light guide plate body 111, in other words, there is a gap between the light incident surface 1121 and the corresponding first light guide surface 111a. As shown in FIG. 4, this gap can accommodate a plurality of light-emitting diodes 1021 arranged in a row, so as to prevent the plurality of light-emitting diodes 1021 from being exposed, and to effectively prevent the light source emitted by the plurality of light-emitting diodes 1021 from scattering to the outside of the curved light guide element 11. All the light sources of the plurality of light-emitting diodes 1021 can enter the curved light guide element 11. If the light incident surface 1121 is opposite to the first light guide surface 111a, that is, if the light incident surface 1121 is located at an inner side of the curved light guide element 11, there is a gap between the light incident surface 1121 and the corresponding second light guide surface 111b. The function of this gap is as same as that of the above-mentioned gap, without particularly described here.

Furthermore, each curved light guide element 11 has four positioning protrusions 113, among which two positioning protrusions 113 are provided at one end of the light guide plate body 111, and the other two positioning protrusions 113 are provided at the other end of the light guide plate body 111. The four positioning protrusions 113 protrude outwardly from two opposite side walls of the light guide plate body 111. The light source supply assembly 10 also includes two positioning assemblies 103. The two positioning assemblies 103 are respectively disposed in the two second accommodating areas 1012 of the fixing base 101, and each positioning assembly 103 covers the four positioning protrusions 113 of each curved light guide element 11 to prevent the two curved light guide elements 11 from separating from the fixing base 101. In this example, each positioning assembly 103 includes a first positioning member 1031 and a second positioning member 1032. The first positioning member 1031 is inserted into the corresponding second accommodating area 1012 from the first fixing opening 1010a of the fixing base 101. The second positioning member 1032 is inserted into the corresponding second accommodating area 1012 from the second fixing opening 1010b of the fixing base 101 and fixed to the first positioning member 1031, so that the positioning assembly 103 is fixed on the fixing base 101. In addition, the second housing 101b of the fixing base 101 has a through groove 1014, and the through groove 1014 is located between the two first accommodating areas 1011, so that the heat energy generated by the two light source modules 102 located in the two first accommodating areas 1011 is dissipated from the through groove 1014, which effectively improves the heat dissipation effect of the lighting device 1.

Figure 5:
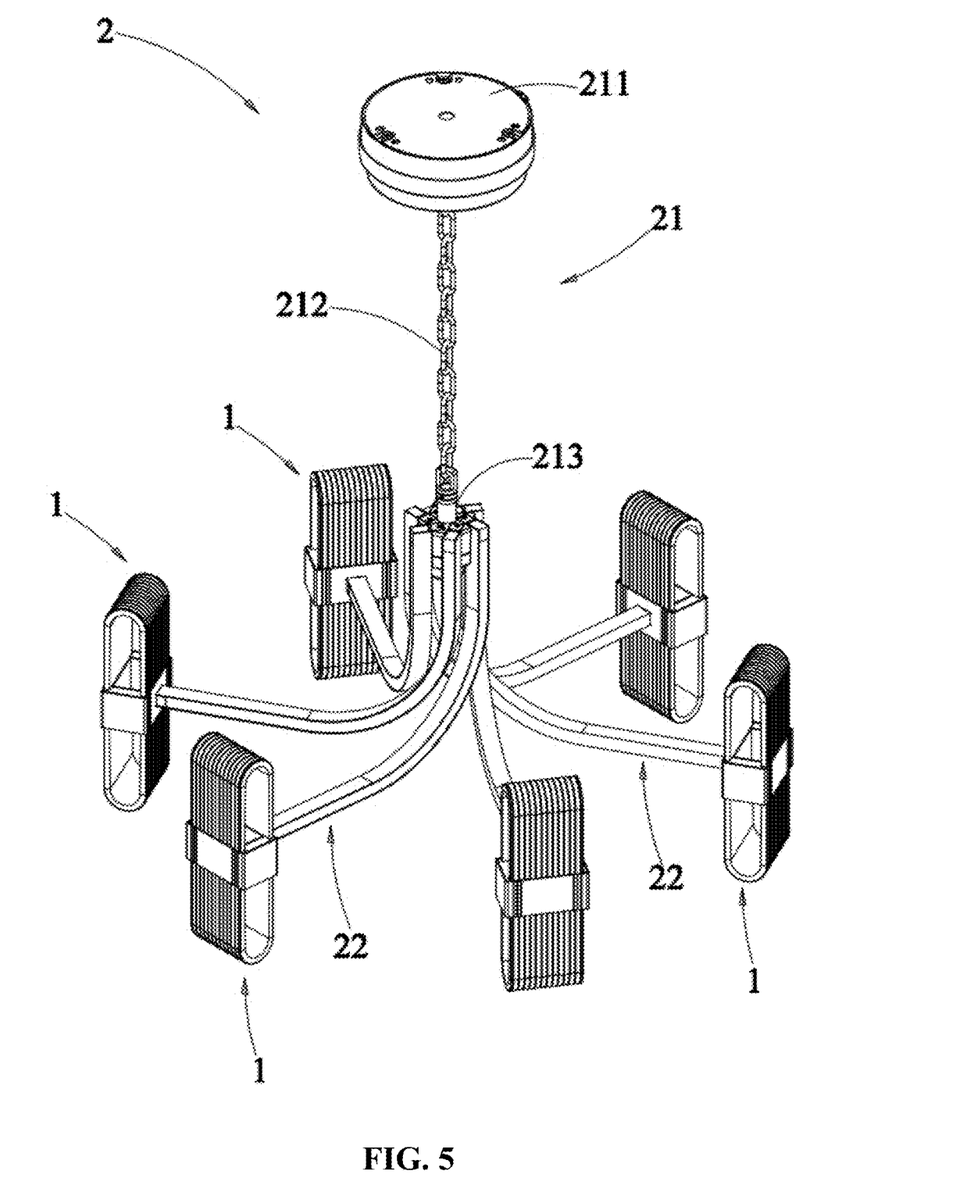
FIG. 5 is a perspective view of a lamp apparatus according to a second example of the present disclosure.
Figure 6:
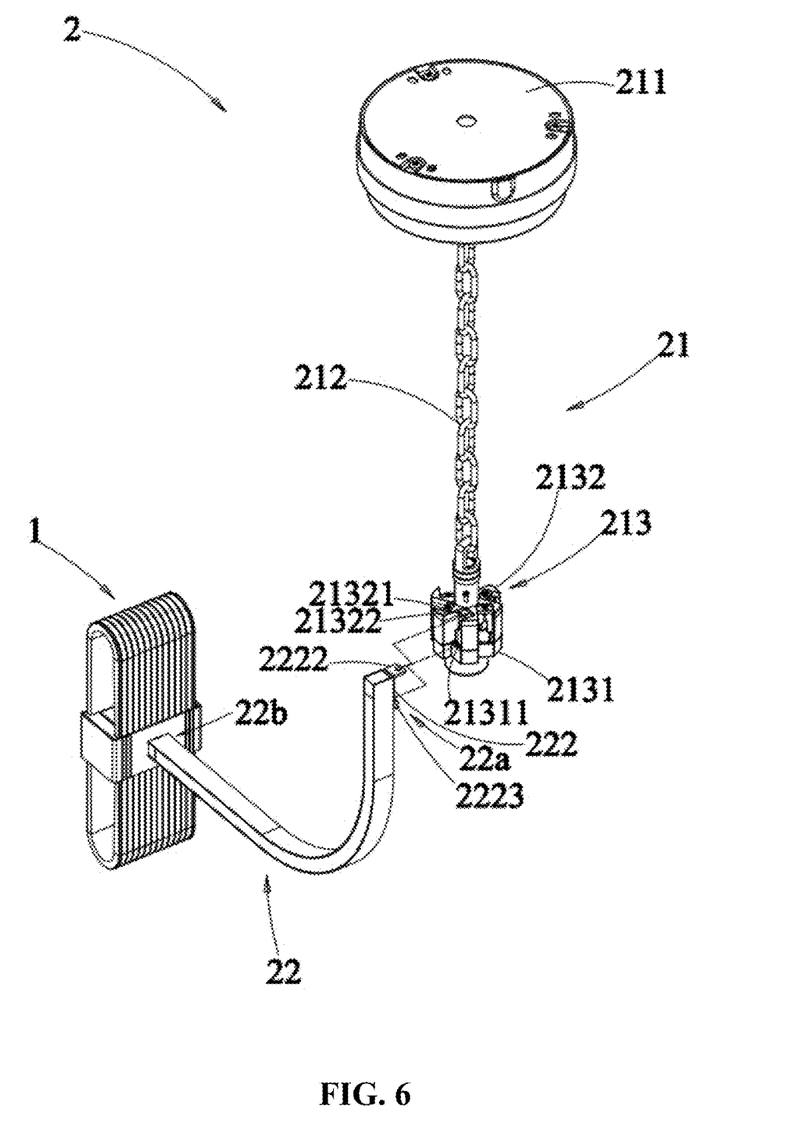
FIG. 6 is a partially exploded perspective view of a lamp apparatus according to a second example of the present disclosure.

Please refer to FIGS. 5-6, which respectively are a perspective view and a partially exploded perspective view of a lamp apparatus according to a second example of the present disclosure; as shown in the figures, this example provides a lamp apparatus 2, the lamp apparatus 2 in this example includes a lamp holder assembly 21, a plurality of brackets 22 and a plurality of lighting devices 1, among which the lighting device 1 uses the lighting device 1 of the first example (please refer to FIGS. 1 to 4 together). The bracket 22 in this example is curved. Of course, the bracket 22 can also be straight, which will not be particularly described here. Each bracket 22 has a first connecting end 22a and a second connecting end 22b. The first connecting end 22a of each bracket 22 is connected to the lamp holder assembly 21, and the second connecting end 22b of each bracket 22 is connected to the corresponding lighting device 1. Please also refer to FIG. 7, which is a partially exploded perspective view of the lamp holder assembly in the second example of the present disclosure; as shown in the figure, the lamp holder assembly 21 includes a fixing mount 211, a connecting piece 212 and a connecting seat 213; the connecting piece 212 connects the fixing mount 211 and the connecting seat 213; the connecting piece 212 in this example is a chain, of course, it can also be a suspension wire or a rod, which will not be particularly described here. The first connecting end 22a of each bracket 22 is connected to the connecting seat 213.

Figure 7:
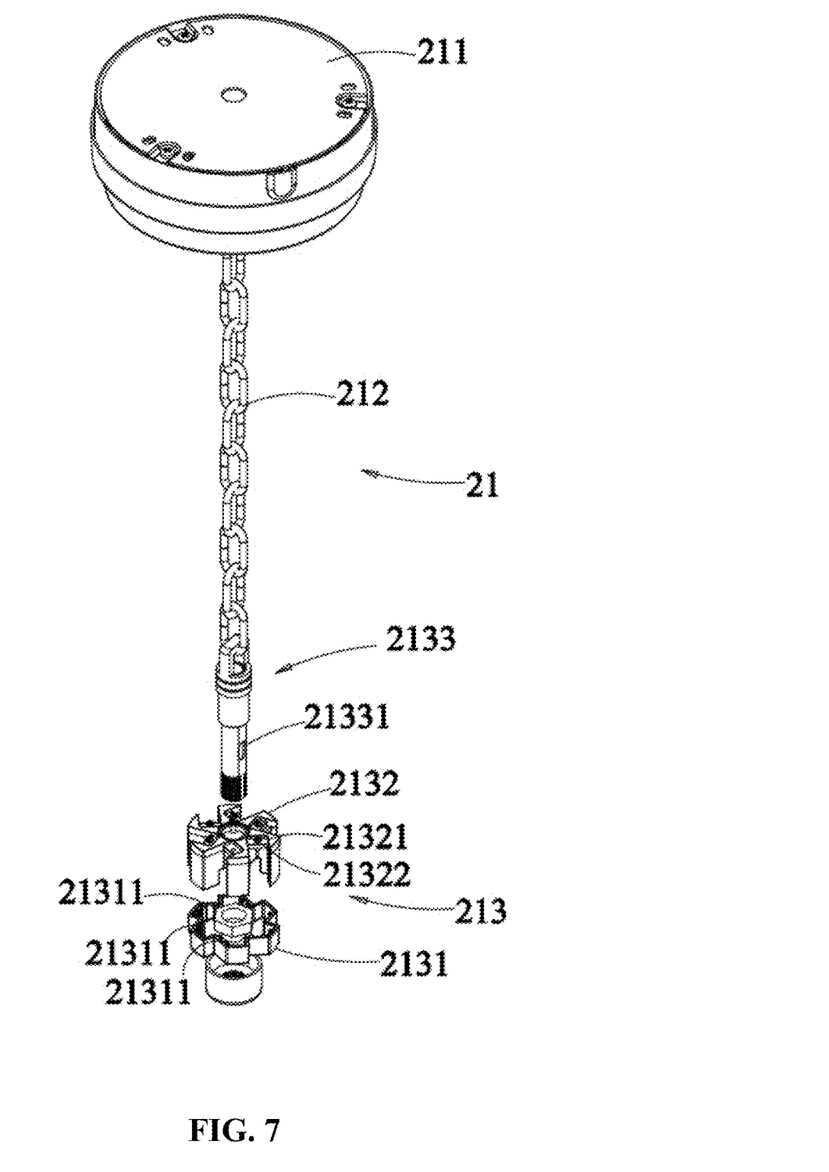
FIG. 7 is an exploded perspective view of a lamp holder assembly according to a second example of the present disclosure.

The connecting seat 213 includes a first seat body 2131, a second seat body 2132, and a fixing column 2133. The second seat body 2132 is disposed on the first seat body 2131. The fixing column 2133 penetrates the first seat body 2131 and the second seat body 2132, and fixes the first seat body 2131 and the second seat body 2132. The first seat body 2131 has a plurality of wiring grooves 21311 formed by penetrating the first seat body 2131 in the height direction; and the second seat body 2132 has a plurality of bracket fixing grooves 21321 formed by penetrating the second seat body 2132 in the height direction. The plurality of bracket fixing grooves 21321 respectively correspond to the plurality of wiring grooves 21311. Each bracket fixing groove 21321 has a fixing protrusion 21322 therein. The fixing column 2133 is a hollow column and has a wiring hole 21331, and the wiring hole 21331 is communicated with the plurality of wiring grooves 21311. The first connecting end 22a of each bracket 22 is disposed in the corresponding bracket fixing groove 21321 and wiring groove 21311.

Figure 8:
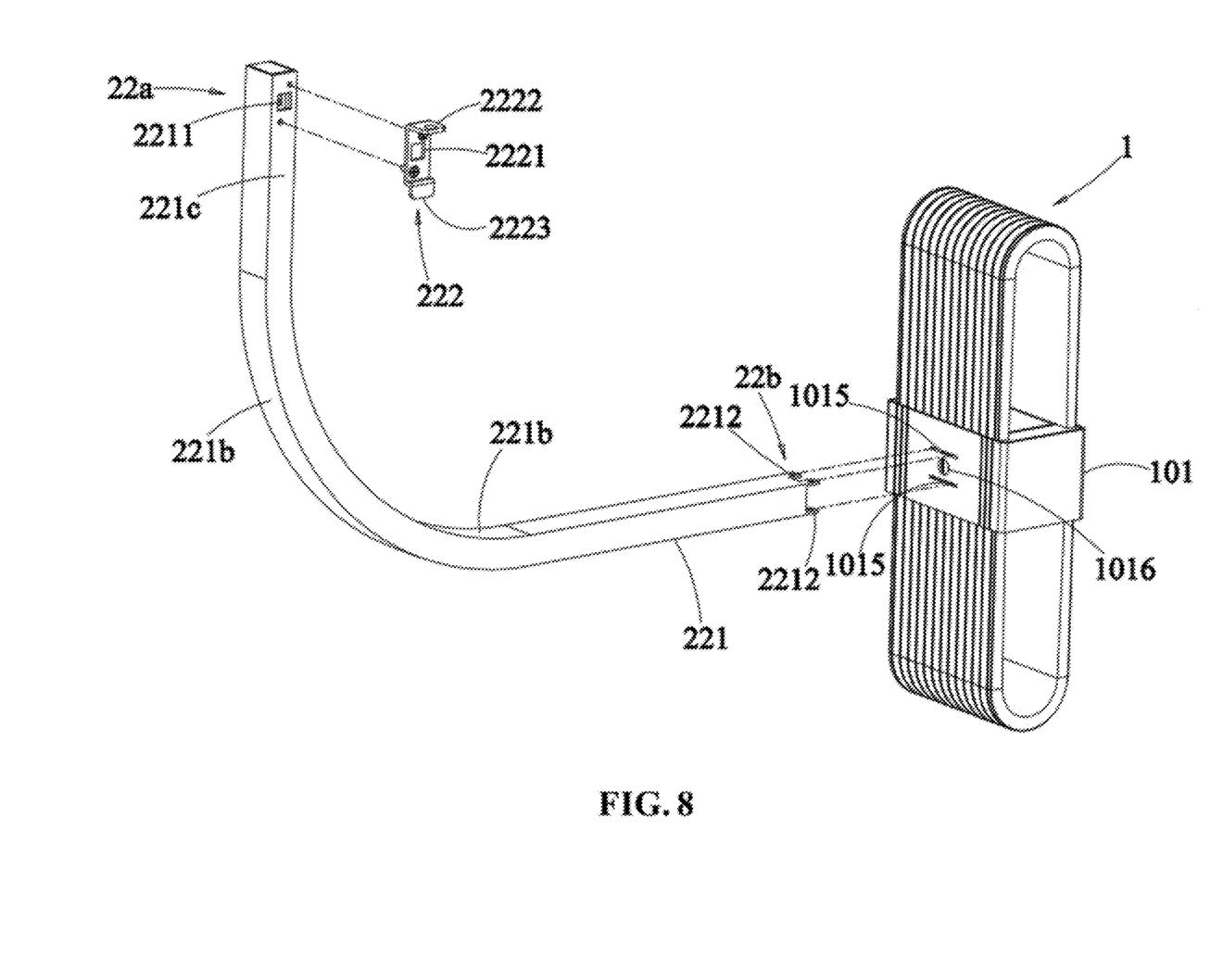
FIG. 8 is a schematic view of a curved bracket assembled with a lighting device according to a second example of the present disclosure.
Figure 9:
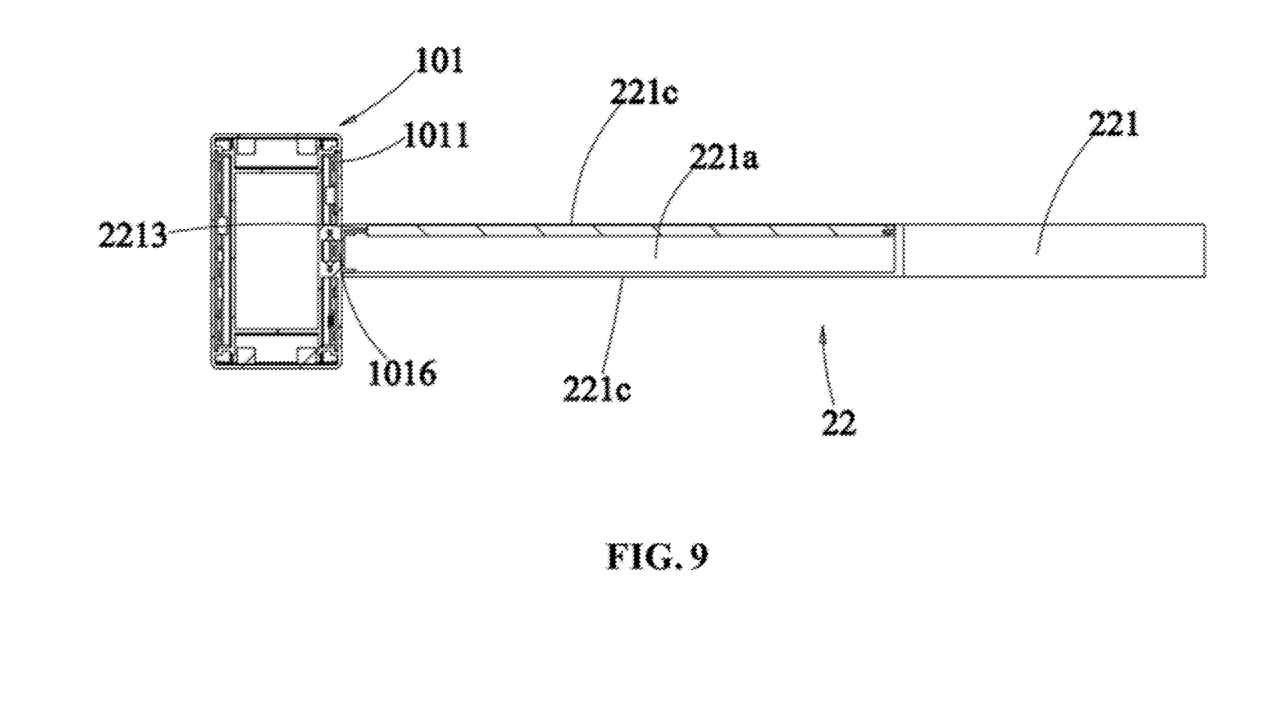
FIG. 9 is a sectional view of a curved bracket according to a second example of the present disclosure.

Furthermore, please refer to FIGS. 8 and 9 together, which are a schematic view of the bracket assembled with the lighting device and a sectional view of the bracket according to the second example of the present disclosure; as shown in the figures, each bracket 22 has a bracket body 221 and a connecting part 222, The bracket body 221 is hollowed and has a wiring space 221a, and has two opposite surfaces 221b and two opposite side surfaces 221c. The connecting part 222 is provided on the surface 221b or side surface 221c at one end of the bracket body 221, and the end of the bracket body 221 provided with the connecting part 222 is the first connecting end 22a of the bracket 22. In this example, the connecting part 222 is disposed on the side surface 221c at one end of the bracket body 221; the side surface 221c provided with the connecting part 222 has a bracket wiring hole 2211 communicated with the wiring space 221a; and the connecting part 222 has a connecting wiring hole 2221 corresponding to the bracket wiring hole 2211. One end of the connecting part 222 has a connecting protrusion 2222 which is close to the end surface of the bracket body 221 and protrudes from the side surface 221c of the bracket body 221. The other end of the connecting part 222 has an engaging protrusion 2223; there is a distance between the engaging protrusion 2223 and the side surface 221c of the bracket body 221; and the distance is equal to a thickness of the side wall of the wiring groove 21311 of the corresponding first seat body 2131. When the first connecting end 22a of the curved bracket 22 is disposed on the connecting seat 213, the engaging protrusion 2223 of the connecting part 222 is firstly disposed in the corresponding wiring groove 21311 of the first seat body 2131, and then abutted against the side surface of the corresponding wiring groove 21311; the connecting protrusion 2222 of the connecting part 222 covers the corresponding fixing protrusion 21322 and is fixed to the corresponding fixing protrusion 21322, so that the connecting part 222 is located in the corresponding bracket fixing groove 21321 and wiring groove 21311.

The other end of the bracket body 221 has two opposite fixing tabs 2212, and the two fixing tabs 2212 are located at the second connecting end 22b of the bracket 22. The two opposite fixing tabs 2212 are respectively disposed on two opposite surfaces 221b or two opposite side surfaces 221c. In this example, the two opposite fixing tabs 2212 are respectively disposed on the two opposite surfaces 221b. The surface of the fixing base 101 connected to the second connecting end 22b of the bracket 22 has two opposite fixing slots 1015 and a wiring hole 1016 located between the two fixing slots 1015. The two fixing slots 1015 and the wiring hole 1016 in this example are communicated with one of the two first accommodating areas 1011. When the two opposite fixing tabs 2212 are respectively inserted into the corresponding fixing slots 1015, the two opposite fixing tabs 2212 are fixed by screws or other fixing parts, so that the second connecting end 22b of the curved bracket 22 is connected to the lighting device 1. The wiring hole 1016 is communicated with the wiring space 221a of the bracket body 221.

When the lamp apparatus 2 of this example is in use, firstly, the fixing mount 211 of the lamp holder assembly 21 is fixed at the position to be installed; the fixing mount 211 therein is provided with a driver or controller; a mains line is electrically connected to the driver or controller in the fixing mains line 211; the wiring of the driver or controller in the fixing mount 211 passes through the wiring hole 21331 of the fixing column 2133 of the connecting seat 213, through the connecting wiring hole 2211 of the connecting piece 222, through the bracket wiring hole 2211 of the bracket body 221, through the wiring space 221a of the bracket body 221 and the wiring hole 1016 of the fixing base 101, then enters the two first accommodating areas 1011 of the fixing base 101, and are electrically connected to the two circuit boards 1020 of the two light source modules 102 in the two first accommodating areas 1011; the two circuit boards 1020 respectively drive the corresponding, plurality of light-emitting diodes 1021, so that the plurality of light-emitting diodes 1021 of the two light source modules 102 can emit light source to light up the two curved light guide elements 11.

In another example, the driver or controller may not be installed in the fixing mount 211. The driver or controller can be directly installed on the circuit board 1020 of the light source module 102, and the external mains line is directly electrically connected to the circuit board 1020. The circuit board 1020 supplies power to the driver or the controller, so that the driver or the controller drives the plurality of light-emitting diodes 1021 on the circuit board 1020 to emit light.

Figure 10:
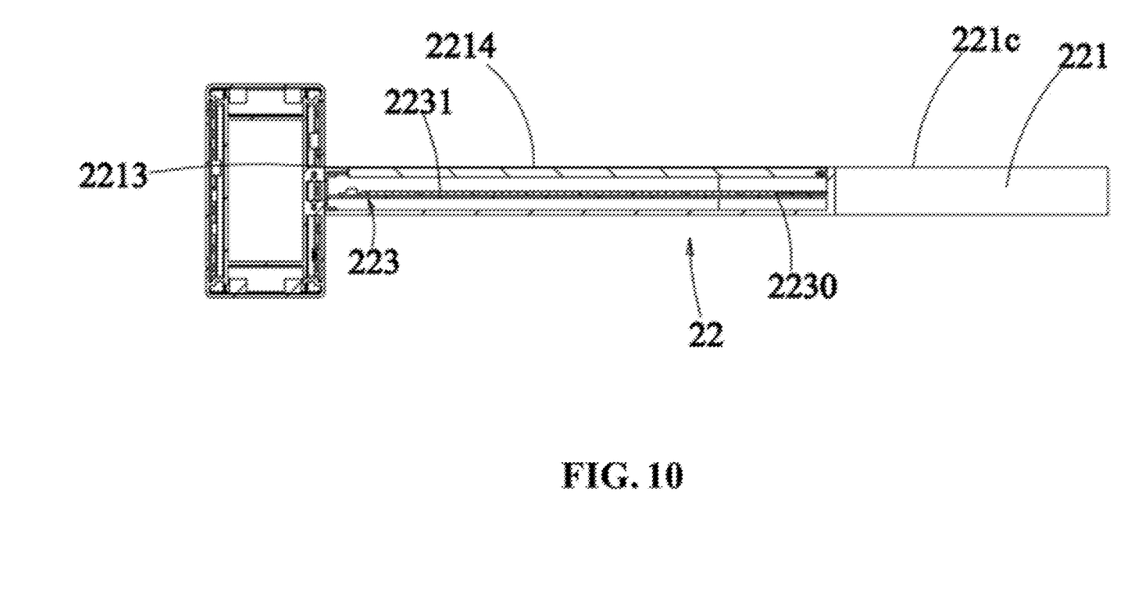
FIG. 10 is a sectional view of a curved bracket according to a third example of the present disclosure.

Please refer to FIG. 10, which is a sectional view of a bracket according to the third example of the present disclosure; as shown in the figure, in this example, one of the two side surfaces 221c of the bracket body 221 of the bracket 22 has an opening 2213 and a light-transmitting part 2214 disposed in the opening 2213, the wiring space 221a of the bracket 22 is further provided with a light source module 223, the light source module 223 has a circuit board 2230 and a plurality of light-emitting diodes 2231 arranged on the circuit board 2230, and the surface of the light source module 223 provided with the plurality of light-emitting diodes 2231 faces the light-transmitting part 2214; the circuit board 2230 is connected with the driver or controller of the fixing mount, so that the light source emitted by the plurality of light-emitting diodes 2231 can exit through the light-transmitting part 2214, and that the bracket 22 can also emit light source to achieve the function of auxiliary lighting. The above-mentioned opening 2213 and the light-transmitting part 2214 can also be provided on one of the two surfaces 221b of the bracket body 221, which will not be particularly described here. The driver or controller of the above-mentioned fixing mount can also be alternatively arranged on the circuit board 2230, without particularly described here.

In summary, the present disclosure provides a lighting device and a lamp apparatus. The lighting device of the present disclosure utilizes a curved light guide element to generate a light source for illumination. The lighting device of the present disclosure constitutes a lamp apparatus with a bracket and a lamp holder assembly. The lighting device, the bracket and the lamp holder assembly are detachable structures, which is convenient for storage and transportation. The light incident portion of the curved light guide element used in the lighting device of this example is relatively narrower, so that most of the light sources can enter the curved light guide element, effectively reducing light energy consumption. In addition, a reflective surface is provided at the light incident portion of the curved light guide element, and the reflective surface can reflect the light source into the curved light guide element, so as to avoid the loss of light energy, and to further improve the luminous efficiency of the lighting device.

It should be noted that, in this article, the terms "comprise", "include" or any other variants thereof are intended to cover non-exclusive inclusion, so that a process, method, article or device including a series of elements not only includes those elements, but also includes other elements not explicitly listed, or elements inherent to the process, method, article, or device. If there are no more restrictions, the element defined by the sentence "including a . . . " does not exclude the existence of other identical elements in the process, method, article or device that includes the element.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The examples of the present disclosure are described above with reference to the accompanying drawings, but the present disclosure is not limited to the above-mentioned examples. The above-mentioned examples are only illustrative and are not limitative. Those of ordinary skill in the art, under the enlightenment of the present disclosure, may make many forms, which all should be fallen within the scope of the present disclosure.

What is claimed is:

1. A lighting device, comprising a light source supply assembly and a curved light guide element, wherein:
    the light source supply assembly comprises a fixing base and a light source module, the fixing base has at least one first accommodating area, and the light source module is disposed in the first accommodating area, and
    at least one end of the curved light guide element is located in the first accommodating area, at least one end of the light guide element has a light incident surface corresponding to the light source module, the light source module supplies light, and the light enters from the light incident surface and propagates along the curved light guide element, wherein the curved light guide element comprises a curved light guide plate body, two positioning protrusions are respectively provided at two ends of the light guide plate body, and the two positioning protrusions respectively protrude from two opposite side walls of the light guide plate body,
    wherein the light source supply assembly further comprises two positioning members, and the two positioning members are arranged on the fixing base and cover the four positioning protrusions of the curved light guide element.

2. The lighting device of claim 1, wherein there are two first accommodating areas, and two ends of the curved light guide element are located in the two first accommodating areas.

3. The lighting device of claim 1, wherein the first accommodating area has opposite two ends, and the two ends of the curved light guide element are located at the opposite two ends of the first accommodating area.

4. The lighting device according to claim 1, wherein there are two curved light guide elements arranged opposite to each other, and there are two first accommodating areas provided corresponding to the two curved light guide elements, the two first accommodating areas are facing away from each other, the curved light guide element has two ends, and the two ends of the curved light guide element are inserted in a same first accommodating area.

5. The lighting device of claim 1, wherein:
    one end of the curved light guide element has a light source introduction bump, the light source introduction bump has a light incident surface corresponding to the light source module, the light source module supplies the light, the light enters from the light incident surface and propagates along the curved light guide element;
    the light source introduction bump has a reflective surface inclined with respect to the light incident surface, and the reflecting surface is located in a propagation direction of the light, an end surface of the light source introduction bump has an inclined surface relative to the light incident surface, the inclined surface is provided with a light shielding layer, and the inclined surface provided with the light shielding layer is the reflective surface; and
    there is an included angle between the light incident surface and the reflective surface, and an angle of the included angle is less than 90 degrees.

6. The lighting device of claim 1, wherein the light incident surface is disposed at an end of the light guide plate body.

7. The lighting device of claim 6, wherein the light guide plate body has a first light guide surface and a second light guide surface opposite to each other, and a distance between the first light guide surface and the second light guide surface at a middle of the light guide plate body is greater than a distance between the first light guide surface and the second light guide surface at both ends of the light guide plate body.

8. The lighting device of claim 7, wherein:
a gap is provided between the light incident surface and the first light guide surface, or a gap is provided between the light incident surface and the second light guide surface; and the light source module is accommodated in the gap.

9. The lighting device of claim 1, wherein the fixing base further comprises a first housing and a second housing disposed inside the first housing, an accommodating space is provided between the first housing and the second housing, the accommodating space comprises two opposite first accommodating areas and two opposite second accommodating areas, and the two second accommodating areas are located between the two first accommodating areas.

10. The lighting device of claim 7, wherein the first light guide surface or/and the second light guide surface of the light guide plate body has/have a microstructure.

11. The lighting device according to claim 10, wherein the microstructure comprises a plurality of patterns and/or a plurality of bumps and/or a plurality of grooves.

12. A lamp apparatus, comprising at least one lighting device and a fixing mount for fixing the lighting device at a preset position, wherein:
the at least one lighting device comprises a light source supply assembly and a curved light guide element, wherein:
the light source supply assembly comprises a fixing base and a light source module, the fixing base has at least one first accommodating area, and the light source module is disposed in the first accommodating area,
at least one end of the curved light guide element is located in the first accommodating area, at least one end of the light guide element has a light incident surface corresponding to the light source module, the light source module supplies light, and the light enters from the light incident surface and propagates along the curved light guide element; and the fixing mount is electrically connected with the lighting device and supplies power to the lighting device, wherein the curved light guide element comprises a curved light guide plate body, two positioning protrusions are respectively provided at two ends of the light guide plate body, and the two positioning protrusions respectively protrude from two opposite side walls of the light guide plate body,
the lamp apparatus further comprises a lamp holder assembly, and
the lamp holder assembly comprises the fixing mount, a plurality of brackets and a plurality of the lighting devices; each of the plurality of brackets has a first connecting end and a second connecting end, the first connecting end of each of the plurality of brackets is connected to the fixing mount, and the second connecting end of each of the plurality of brackets is connected to the lighting device.

13. The lamp apparatus of claim 12 wherein:
the lamp holder assembly further comprises a connecting piece and a connecting seat,
the connecting piece connects the fixing base and the connecting seat, and
the first connecting end of each of the plurality of brackets is connected to the connecting seat.

14. The lamp apparatus of claim 13, wherein:
the connecting seat comprises a first seat body, a second seat body, and a fixing column, the first seat body has a plurality of wiring grooves,
the second seat body is provided on the first seat body and has a plurality of bracket fixing grooves corresponding to the plurality of wiring grooves, and
the fixing column penetrates the first seat body and the second seat body, and fixes the first seat body and the second seat body; the fixing column has a wiring hole, the wiring hole is communicated with the plurality of wiring grooves, and the first connecting end of each of the plurality of brackets is disposed at a corresponding bracket fixing groove and a corresponding wiring groove.

15. The lamp apparatus of claim 12, wherein:
the bracket comprises a bracket body and a connecting part, the bracket body has a wiring space, and the connecting part is disposed at one end of the bracket body;
the end of the bracket body provided with the connecting part is the first connecting end, a surface provided with the connecting part has a bracket wiring hole communicated with the wiring space;
the connecting part has a connecting wiring hole and is disposed at the corresponding bracket fixing groove and the corresponding wiring groove, the wiring groove is communicated with the wiring space through the connecting wiring hole;
one end of the connecting part has a connecting protrusion, and the other end of the connecting part has an engaging protrusion, the engaging protrusion is disposed in the corresponding wiring groove, the connecting protrusion is fixed to a fixing protrusion of the corresponding bracket fixing groove; and
a distance is provided between the engaging protrusion and the surface of the bracket body provided with the connecting part, and the distance is equal to a thickness of a side wall of the wiring groove.

16. The lamp apparatus of claim 15, wherein:
an end of the bracket body facing away from the first connecting end is provided with two opposite fixing tabs, and the end of the bracket body provided with the two fixing tabs is the second connecting end,
a surface of the fixing mount connected to the second connecting end has two opposite fixing slots and a wiring hole, the two opposite fixing tabs are respectively disposed in corresponding fixing slots, and
the wring hole is communicated with the wiring space of the bracket body and with the fixing slot.

17. The lamp apparatus of claim 15, wherein:
a surface of the bracket body has an opening and a light-transmitting part disposed in the opening,
the wiring space is further provided with a light source module, and
the plurality of light-emitting diodes of the light source module correspond to the light transmitting part.

* * * * *